Feb. 19, 1924.
A. P. KAHL
VALVE TRUING MACHINE
Filed Nov. 14, 1921
1,484,133
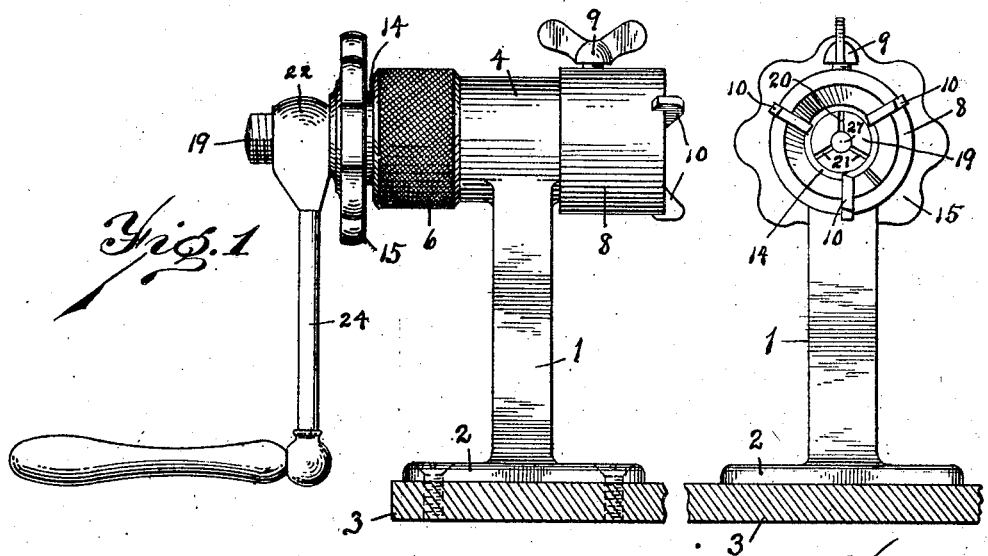
Fig. 1
Fig. 2
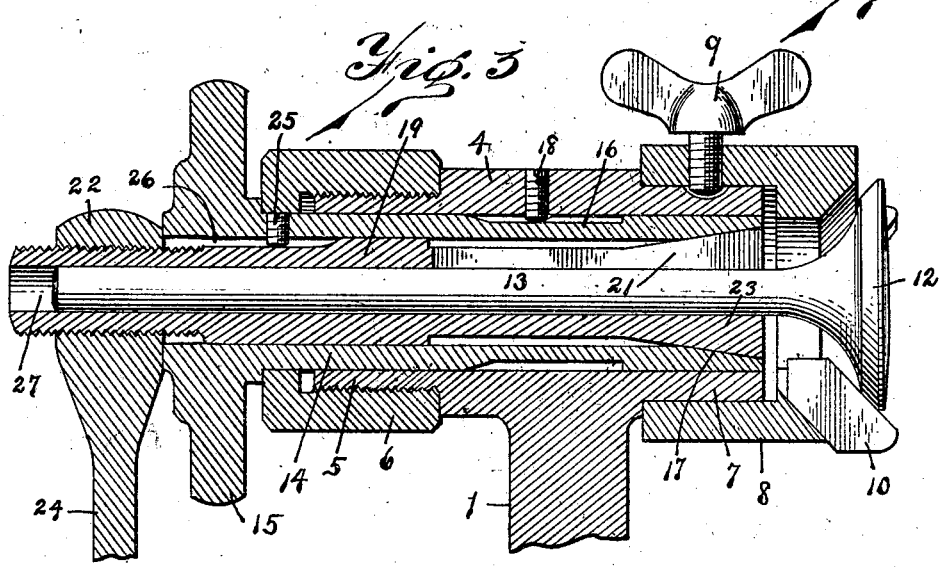
Fig. 3
INVENTOR.
Albert P. Kahl
BY
Edward N. Pagelsen
ATTORNEY.

Patented Feb. 19, 1924.

1,484,133

UNITED STATES PATENT OFFICE.

ALBERT PROCTOR KAHL, OF DETROIT, MICHIGAN.

VALVE-TRUING MACHINE.

Application filed November 14, 1921. Serial No. 514,939.

*To all whom it may concern:*

Be it known that I, ALBERT P. KAHL, a citizen of the United States, and residing at Detroit, in the county of Wayne and State of Michigan, have invented a new and Improved Valve-Truing Machine, of which the following is a specification.

This invention relates to means for dressing the operating faces of puppet valves, particularly those used in internal combustion engines, and its object is to provide a machine of this character which shall be simple in construction, easily operated and which will turn out accurate work.

This invention consists in a tubular body and a cylindrical valve-carrying spindle rotatable therein adapted to receive and grip the stems of puppet valves, a tool carrier mounted on the body adapted to support proper cutting tools to true the working faces of the valves, and means to move the spindle longitudinally to press the valves against the cutting tools.

It further consists in a valve carrying spindle formed of inner and outer parts, the inner part being a collet slidable within an outer sleeve and provided with jaws at one end which are drawn together when that end of the collet is moved inwardly and provided with threads on its opposite end to receive the threaded hub of a crank handle, the crank handle being adapted to not only turn the spindle but to also engage the adjacent end of the sleeve part thereof to slide the collet longitudinally to cause said jaws to close down on a valve stem.

It also consists in the details of construction illustrated in the accompanying drawing and particularly pointed out in the claims.

In the accompanying drawing, Fig. 1 is a side elevation and Fig. 2 a front elevation of this improved valve truing machine. Fig. 3 is a longitudinal section thereof on a larger scale.

Similar reference characters refer to like parts throughout the several views.

The present machine embodies a standard or pedestal 1 which may be secured in a vise or other tool or be provided with a base 2 which may be attached to a bench 3 or other support. At the upper end of the pedestal is a rigid body 4, preferably cylindrical, having its rear end 5 threaded to receive the threaded collar 6 and its front end 7 fitted into a cylindrical head 8 which may be secured in position by a screw 9. This head may be fitted with any desired number and type of truing cutters 10, but three are preferred. They are preferably so positioned that their cutting edges are in radial planes and are mounted in slots in the end of the head. The angle of the cutting edge will depend upon the angle of the valve seat and as these angles vary in different types of engines, these heads should be interchangeable.

The valve 12 shown in Fig. 3 is of well known construction and has a stem 13 which may be integral with the valve or separate therefrom. The spindle which receives this valve is of two parts, an outer sleeve 14 having a hand wheel 15 at its rear end, a reduced portion 16 intermediate its ends, and an outwardly flaring bore 17 at its front end. The longitudinal movement of this sleeve may be limited by the screw 18 which extends into the space around the reduced middle portion of the sleeve.

Slidable within the sleeve is a collet 19 having any desired number of longitudinal slits 21, preferably three, dividing one end of the collet into jaws 23 whose outer surfaces are conical to fit the flaring bore 17 of the sleeve 14. The rear end of the collet is threaded to receive the threaded hub 22 of the crank handle 24 and a screw 25 mounted in the sleeve 14 and extending into the groove 26 in the collet prevents rotation between the sleeve and collet. The collet has a central hole 27 to receive the valve stem 13.

The operation of this tool is as follows. The crank handle being partly unscrewed to free the jaws 23 and permit them to expand, the collar 6 is screwed up onto the threaded portion 5 of the body 4 and the sleeve 16 and collet are pushed to the right in Figs. 1 and 3 to the limit of their movements in that direction. The valve stem 13 is then slipped into the collet until the valve engages the cutters 10.

The operator now grasps the wheel 15 and turns the crank handle until the collet has been drawn into the sleeve 14 sufficiently to cause the jaws 23 to grip the valve stem 13. He now releases the hand wheel 15 but continues to turn the crank handle, and at the same time he turns the collar 6 to unscrew it from the threaded end 5 of the body 4 which pushes the sleeve 14 and the collet to the left in Figs. 1 and 3 and presses the valve 12 against the cutters 10. This operation is continued until the valve is properly trued.

The distance from the adjacent ends of the supporting jaws 23 to the valve is so short that the valve stem cannot spring sufficiently to cause appreciable inaccuracies in the face of the valve which becomes or remains conical. The endwise movement of the valve against the cutters 10 by means of the collar 16 can be accurately controlled and determined by the force found necessary to turn the collar.

The form of the device for preventing the sleeve 14 from turning and the proportions and details of the other parts of this machine may all be changed by those skilled in the art without departing from the spirit of my invention as set forth in the following claims.

I claim:—

1. In a machine for truing valves, the combination of a body having a cylindrical bore, a cylindrical sleeve rotatable therein, a collet slidable in the sleeve and adapted to receive a valve stem, a cutting tool mounted at one end of the body to engage the valve, means to rotate the collet and valve, and a collar threaded on the body to move the collet and valve endwise to press the valve against the cutting tool.

2. In a machine for truing valves, the combination of a body having a cylindrical bore, a cylindrical sleeve rotatable therein, a collet slidable in the sleeve and adapted to receive a valve stem, a head removably mounted on the body and a series of radial cutters mounted in said head and adapted to engage the valve, means to rotate the collet and valve, and a collar threaded on the body to move the collet and valve endwise to press the valve against the cutters.

3. In a machine for truing valves, the combination of a body having a cylindrical bore, a cylindrical sleeve rotatable therein, a collet slidable in the sleeve and having inwardly tapering jaws at one end and a threaded portion at the other, a crank handle screwed on the threaded end and adapted to engage the adjacent end of the sleeve to cause the jaws to be drawn into the sleeve and compressed thereby, said collet being adapted to receive a valve stem, cutting tools mounted at the end of the body adjacent the jaws of the collet, and means mounted on the body to move the sleeve and collet endwise to push the valve against the cutting tools.

4. In a machine for truing valves, the combination of a body having a cylindrical bore, a cylindrical sleeve rotatable therein, a collet slidable in the sleeve and having inwardly tapering jaws at one end and a threaded portion at the other, a crank handle screwed on the threaded end and adapted to engage the adjacent end of the sleeve to cause the jaws to be drawn into the sleeve and compressed thereby, said collet being adapted to receive a valve stem, cutting tools mounted at the end of the body adjacent the jaws of the collet, and means mounted on the body to move the sleeve and collet endwise to push the valve against the cutting tools, said sleeve being formed with a hand wheel whereby it may be prevented from turning while the crank handle is being screwed onto the collet.

5. In a machine for truing valves, the combination of a body having a cylindrical bore, a cylindrical sleeve rotatable therein, a collet slidable in the sleeve and having inwardly tapering jaws at one end and a threaded portion at the other, a crank handle screwed on the threaded end and adapted to engage the adjacent end of the sleeve to cause the jaws to be drawn into the sleeve and compressed thereby, said collet being adapted to receive a valve stem, cutting tools mounted at the end of the body adjacent the jaws of the collet, means mounted on the body to move the sleeve and collet endwise to push the valve against the cutting tools, means to limit the longitudinal movements of the sleeve in the body, and means to prevent the collet from turning in said sleeve.

ALBERT PROCTOR KAHL.